United States Patent
Marchya et al.

(10) Patent No.: US 11,151,965 B2
(45) Date of Patent: Oct. 19, 2021

(54) METHODS AND APPARATUS FOR REFRESHING MULTIPLE DISPLAYS

(71) Applicant: QUALCOMM Incorporated, San Diego, CA (US)

(72) Inventors: Dileep Marchya, Hyderabad (IN);
Srinivas Pullakavi, Kakinada (IN);
Prashant Nukala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/548,587

(22) Filed: Aug. 22, 2019

(65) Prior Publication Data
US 2021/0056933 A1  Feb. 25, 2021

(51) Int. Cl.
*G06T 1/00* (2006.01)
*G09G 5/36* (2006.01)
*G06T 1/20* (2006.01)
*G06T 1/60* (2006.01)

(52) U.S. Cl.
CPC ............... *G09G 5/363* (2013.01); *G06T 1/20* (2013.01); *G06T 1/60* (2013.01); *G09G 2360/04* (2013.01); *G09G 2370/10* (2013.01)

(58) Field of Classification Search
None
See application file for complete search history.

(56) References Cited

U.S. PATENT DOCUMENTS

| 6,195,086 B1* | 2/2001 | Perlman | G09G 5/12 345/1.1 |
| 8,665,283 B1* | 3/2014 | Lim | G09G 5/393 345/537 |
| 2004/0075621 A1* | 4/2004 | Shiuan | G06F 3/1431 345/1.1 |
| 2007/0285439 A1* | 12/2007 | King | G09G 5/397 345/638 |
| 2008/0028137 A1* | 1/2008 | Schakel | G11C 11/40618 711/106 |

(Continued)

FOREIGN PATENT DOCUMENTS

EP  3410426 A1  12/2018

OTHER PUBLICATIONS

International Search Report and Written Opinion—PCT/US2020/046807—ISA/EPO—dated Nov. 5, 2020.

*Primary Examiner* — Anh-Tuan V Nguyen
(74) *Attorney, Agent, or Firm* — Campbell C. Chiang; Procopio, Cory, Hargreaves & Savitch LLP (57) ABSTRACT

The present disclosure relates to methods and apparatus for display processing. Aspects of the present disclosure can determine a refresh offset for at least one group of lines in a first display based on at least one group of lines in a second display. Aspects of the present disclosure can also apply the refresh offset for the at least one group of lines in the first display based on the at least one group of lines in the second display. Further, aspects of the present disclosure can adjust combined instantaneous bandwidth corresponding to each of the at least one group of lines in the first display and each of the at least one group of lines in the second display based on the applied refresh offset. Aspects of the present disclosure can also determine one or more overlapping layer regions based on the first display and the second display.

28 Claims, 6 Drawing Sheets

(56) References Cited

U.S. PATENT DOCUMENTS

| | | | |
|---|---|---|---|
| 2009/0295680 A1* | 12/2009 | Lida | G06F 3/1454 |
| | | | 345/1.1 |
| 2011/0063315 A1* | 3/2011 | Ghosh | G09G 5/395 |
| | | | 345/536 |
| 2014/0184629 A1* | 7/2014 | Wyatt | G09G 5/393 |
| | | | 345/547 |
| 2015/0310798 A1* | 10/2015 | Heide | G09G 3/36 |
| | | | 345/55 |
| 2017/0053620 A1 | 2/2017 | Law et al. | |
| 2017/0193971 A1* | 7/2017 | Bi | G09G 5/12 |
| 2017/0278482 A1* | 9/2017 | Purushothaman | G06F 3/14 |
| 2017/0287106 A1* | 10/2017 | Liu | G06T 1/60 |
| 2018/0061375 A1* | 3/2018 | Marquardt | G09G 5/14 |
| 2018/0115743 A1* | 4/2018 | McLoughlin | H04N 7/04 |
| 2018/0174550 A1* | 6/2018 | Zhang | G09G 5/005 |
| 2018/0249119 A1* | 8/2018 | Guenter | G06F 3/011 |
| 2018/0307042 A1* | 10/2018 | Riguer | G06T 19/006 |
| 2019/0043411 A1* | 2/2019 | Chaudhari | G06F 3/1431 |
| 2019/0371264 A1* | 12/2019 | Koo | G09G 5/006 |
| 2019/0371271 A1* | 12/2019 | Morris | G06F 3/1438 |

* cited by examiner

METHODS AND APPARATUS FOR REFRESHING MULTIPLE DISPLAYS

TECHNICAL FIELD

The present disclosure relates generally to processing systems and, more particularly, to one or more techniques for display or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processor, a display processing unit (DPU), a graphics processing unit (GPU), or a video processor. The apparatus can determine a refresh offset for at least one group of lines in a first display based on at least one group of lines in a second display. The apparatus can also apply the refresh offset for the at least one group of lines in the first display based on the at least one group of lines in the second display. Additionally, the apparatus can adjust a combined instantaneous bandwidth corresponding to each of the at least one group of lines in the first display and each of the at least one group of lines in the second display based on the applied refresh offset. The apparatus can also determine one or more overlapping layer regions based on the first display and the second display. The apparatus can also calculate an instantaneous bandwidth for each of the at least one group of lines in the first display and each of the at least one group of lines in the second display and/or calculate a combined instantaneous bandwidth for each of the one or more overlapping layer regions. Further, the apparatus can calculate a difference between a frame retirement duration for the first display and a frame retirement duration for the second display. The apparatus can also reduce the combined instantaneous bandwidth corresponding to each of the at least one group of lines in the first display and each of the at least one group of lines in the second display. The apparatus can also map the refresh offset to each of the at least one group of lines in the first display and each of the at least one group of lines in the second display, where the combined instantaneous bandwidth is based on the mapped refresh offset.

The details of one or more examples of the disclosure are set forth in the accompanying drawings and the description below. Other features, objects, and advantages of the disclosure will be apparent from the description and drawings, and from the claims.

DETAILED DESCRIPTION

Some aspects of dual display processing may implement an aligned display refresh, such that the refresh timing of both displays is aligned. When the dual displays are aligned and operate the refresh timing simultaneously, the bandwidth used to fetch the data for both displays is combined. For instance, when the data is fetched for multiple displays, the data may be fetched at the same speed, so the bandwidths can be combined in corresponding sections. When data is fetched at a certain speed or bandwidth, the power consumed increases in proportion to the speed or bandwidth. Accordingly, the amount of power can increase rapidly if the bandwidth is high. Aspects of the present disclosure can offset the refresh start time of one display compared to the other display in a dual panel display. By doing so, the present disclosure can reduce the peak bandwidth of display sections or groups of display lines in order to result in a corresponding reduction in power consumed. For example, rather than refreshing the dual panels at the same time, the present disclosure can offset the refresh start times of both displays, which can result in a reduction in feedback and power consumption.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
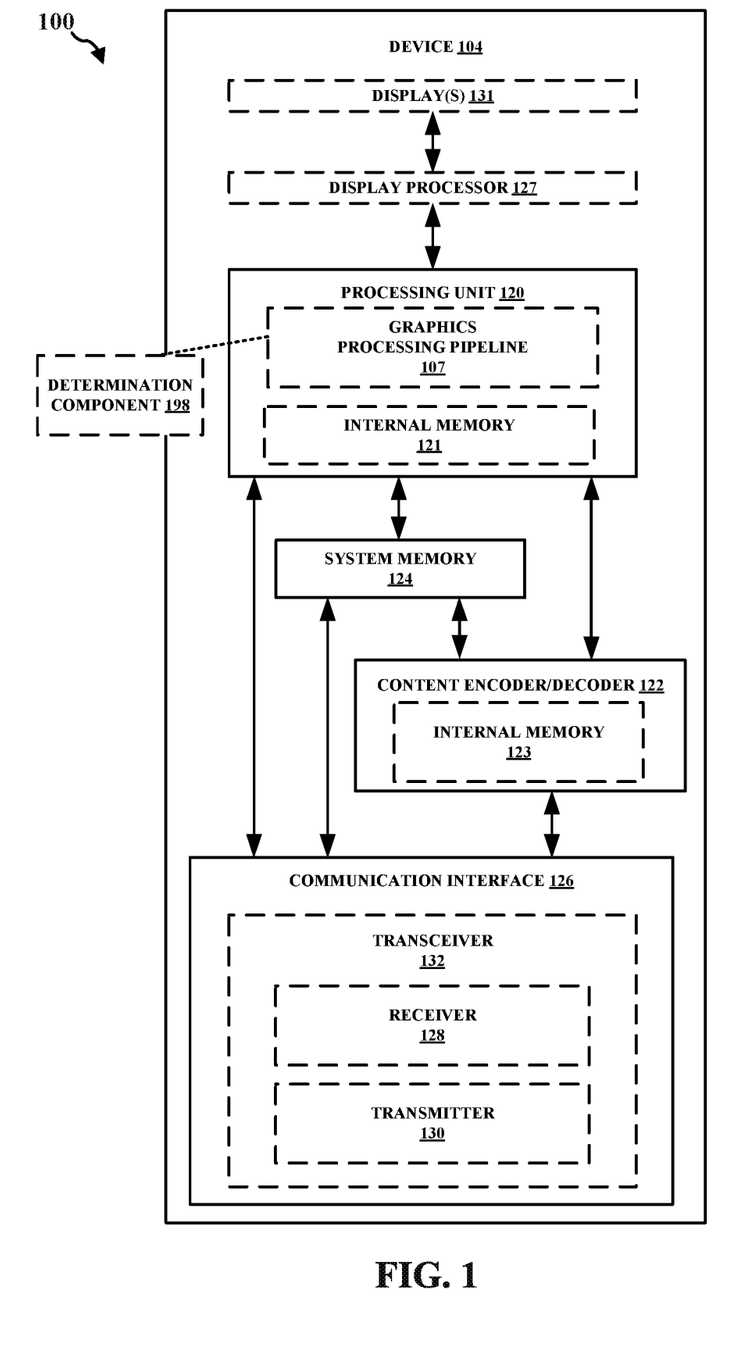
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine a refresh offset for at least one group of lines in a first display based on at least one group of lines in a second display. The determination component 198 can also be configured to apply the refresh offset for the at least one group of lines in the first display based on the at least one group of lines in the second display. The determination component 198 can also be configured to adjust a combined instantaneous bandwidth corresponding to each of the at least one group of lines in the first display and each of the at least one group of lines in the second display based on the applied refresh offset. The determination component 198 can also be configured to determine one or more overlapping layer regions based on the first display and the second display. The determination component 198 can also be configured to calculate an instantaneous bandwidth for each of the at least one group of lines in the first display and each of the at least one group of lines in the second display and/or calculate a combined instantaneous bandwidth for each of the one or more overlapping layer regions. The determination component 198 can also be configured to calculate a difference between a frame retirement duration for the first display and a frame retirement duration for the second display. The determination component 198 can also be configured to reduce the combined instantaneous bandwidth corresponding to each of the at least one group of lines in the first display and each of the at least one group of lines in the second display. The determination component 198 can also be configured to map the refresh offset to each of the at least one group of lines in the first display and each of the at least one group of lines in the second display, where the combined instantaneous bandwidth is based on the mapped refresh offset.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
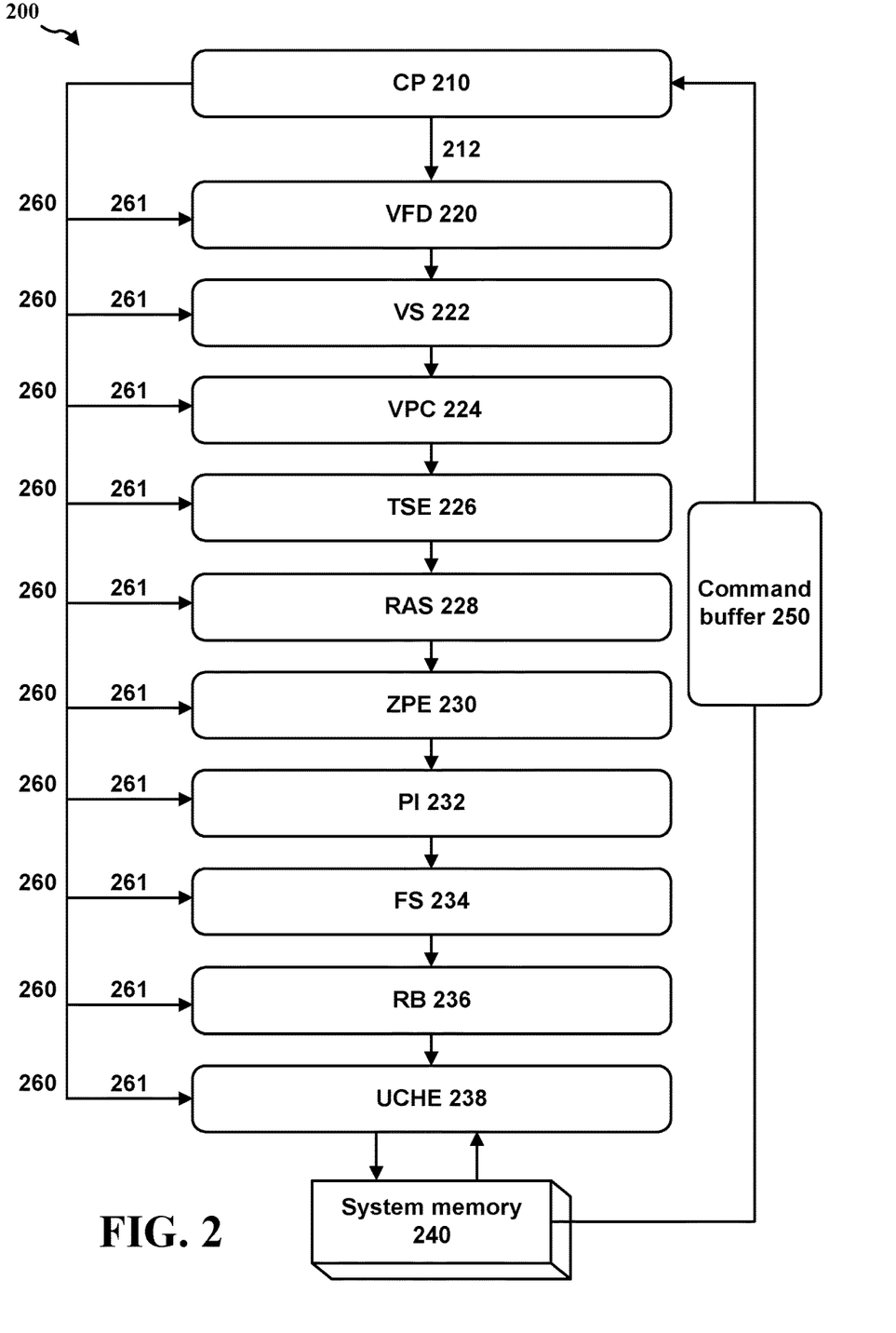
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Dual screen displays are used increasingly in the market, e.g., for use in smartphones or other display devices. Some aspects of dual screen displays can include foldable displays, i.e., side-by-side displays, or fixed displays, i.e., front-back displays, for use in dual screen devices or phones. There are also examples of different dual screen display modes or different displays across chipset tiers. In some aspects, dual screen displays, e.g., in smartphones, can utilize display panels with different display modes. For example, dual screen displays can utilize video mode panels or command mode panels.

Video mode panels can receive display lines or a group of pixels from a host or display processor in order to be displayed on the display screen. Command mode panels can include memory or RAM inside the panel. In some aspects, the display or host processor can process the display lines or pixels and store the information in the memory. The command mode panels can then retrieve the layer or pixel information from the memory. In some aspects, video mode panels may be manufactured at a reduced cost compared to command mode panels, but command mode may function more efficiently. In some aspects, a device can include either video mode panels or command mode panels. While video mode panels may be capable of running in video mode, command mode panels may be capable or running in both video or command mode.

Dual screen display panels can refresh the display periodically. In some aspects of video mode panels, the timing of the refresh can be governed by the display or host processor. For video mode panels, the refresh timing for both panels may be started at same time by the host or display processor. By doing so, both panels can be sourced from the same clock and always be synchronized with each other. For example, the timing engine for the refresh timing in a video mode panel may be governed by the host or display processor.

In some aspects of command mode panels, the refresh timing can be governed by the panels. In other aspects of command mode panels, the panels may be operated as video mode panels, e.g., for high frame rate cases when the refresh timing is governed by a display or host processor. As such, command mode panels can operate in both video mode and command mode. Accordingly, the host or display processor can also govern the refresh timing in command mode. In some aspects, the host or display processor can transfer the refresh data to the command mode panel, and then the panel can store the refresh data in the memory. By doing so, the command mode panel can decide when to refresh the panel.

For dual display screens utilizing command mode, the timing of the two displays in command mode can be independent from one another. When the timing of the two displays is independent, the refresh start time of the panels can also be independent. In some aspects of command mode panels, a clock source may reside inside of the panels, and both panels may start the refresh independently. In some instances, the self-refresh timeline for each panel can be different from the other panel. Additionally, the self-refresh timeline can depend on the relative time each panel was powered on, as well as the drift over time.

Figure 3A:
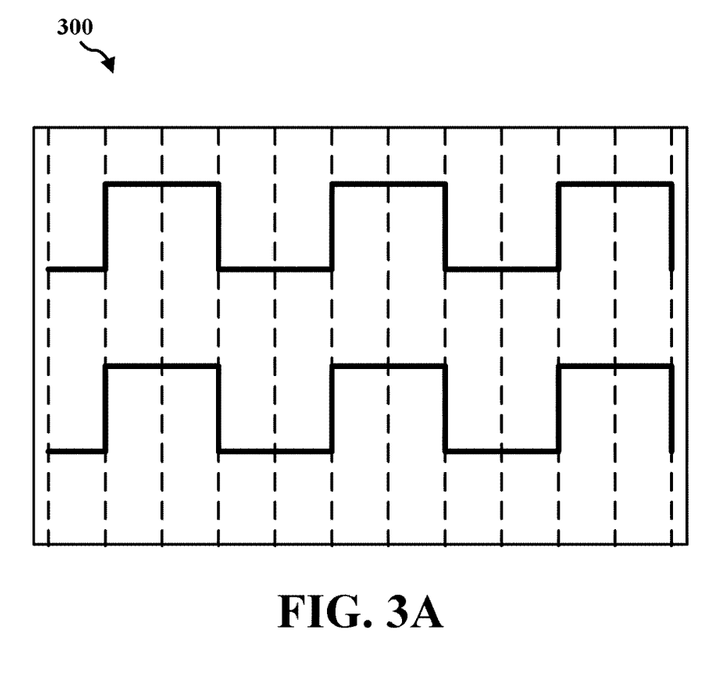
FIGS. 3A and 3B illustrate example timing diagrams in accordance with one or more techniques of this disclosure.
Figure 3B:
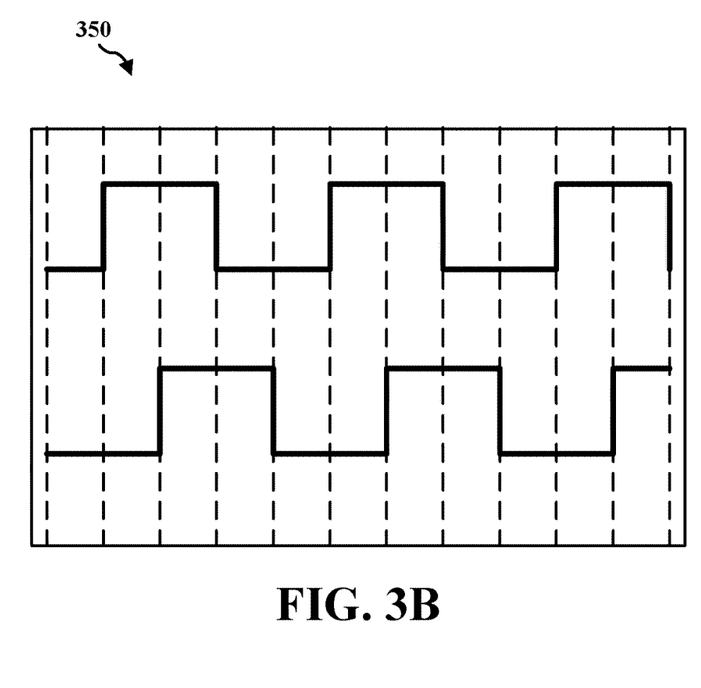

FIGS. 3A and 3B illustrate example timing diagrams 300 and 350, respectively, in accordance with one or more techniques of this disclosure. More specifically, FIG. 3A displays a timing diagram 300 of the vertical synchronization (VSYNC) pulses for video mode panels. As shown in FIG. 3A, for panels operating in video mode, the refresh timing of both panels can be synchronized. FIG. 3B displays a timing diagram 350 of the VSYNC pulses for command mode panels. As shown in FIG. 3B, for panels operating in command mode, the refresh timing of each panel can be independent from the other panel.

The bandwidth for a group of lines or pixels in a display can be the rate of data transfer for those lines or pixels. In some aspects, the display bandwidth can be proportional to the total number of bytes that the display processor fetches in each line time. As such, the bandwidth can be equal to the speed at which data is fetched for a group of lines in the display panel. In some instances, the bandwidth consumption may peak at lines where a number of display layers overlap or blend together. As displayed below, the peak bandwidth, e.g., 2× bandwidth or 2 times the normal bandwidth, may occur at lines where multiple display layers overlap on each display. An occurrence of peak bandwidth may cause a double data rate (DDR), which is a type of memory or RAM, in order to run at a high frequency and result in a high power consumption.

In some aspects, a display panel may have refresh time limits for certain areas of the screen. For example, the display may need to update the refresh within a certain time period at certain display sections. As such, the display may need to complete all of the display refreshes within a certain time period. As mentioned above, when a region with a number of lines include multiple layers that are overlapped, the data may need to be fetched at the same speed for this region. For example, the data may be fetched at twice or 2× the speed if two layers are overlapped.

Figure 4A:
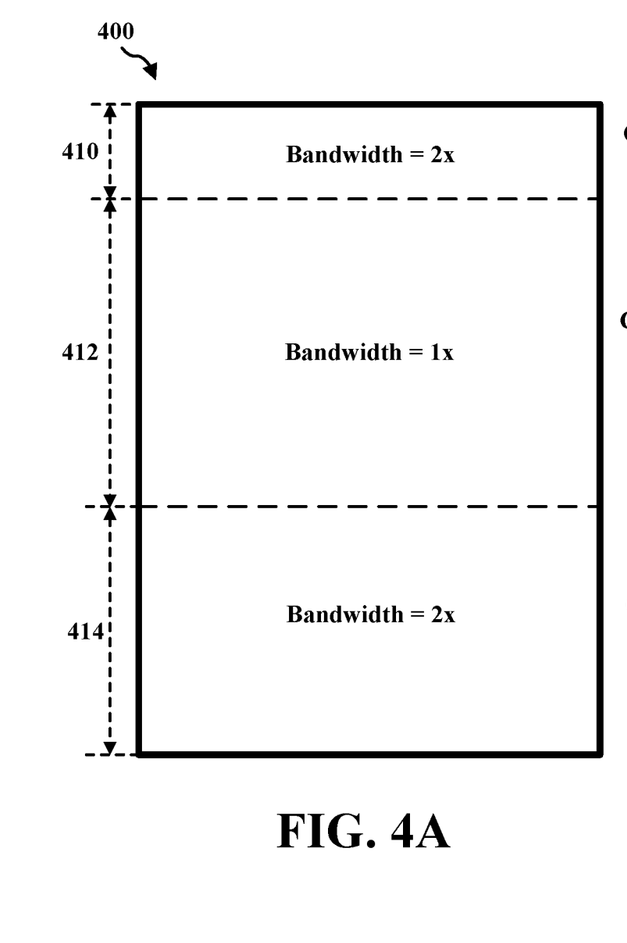
FIGS. 4A and 4B illustrate example displays in accordance with one or more techniques of this disclosure.
Figure 4B:
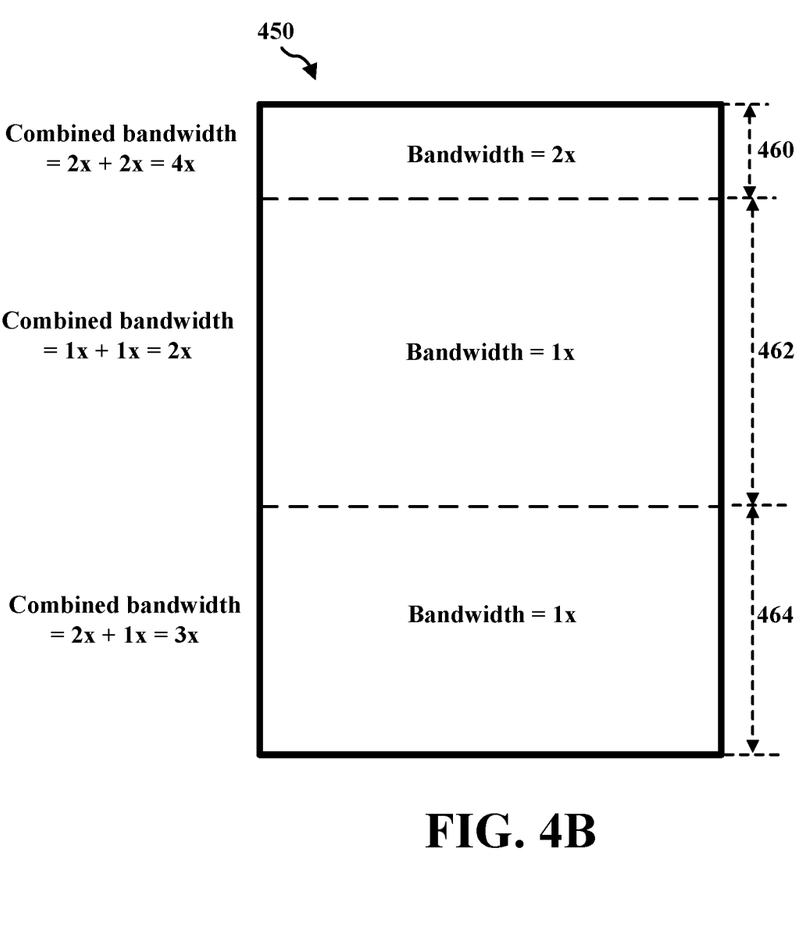

FIGS. 4A and 4B illustrate example displays 400 and 450, respectively. More specifically, FIGS. 4A and 4B show the bandwidth or instantaneous bandwidth in overlapping regions for an aligned display refresh timeline including displays 400 and 450. For example, the left display 400 is one half of a dual display and the right display 450 is the other half of the dual display. As shown in FIG. 4A, display 400 includes first group of lines or pixels 410, second group of lines 412, and third group of lines 414. As shown in FIG. 4B, display 450 includes first group of lines or pixels 460, second group of lines 462, and third group of lines 464.

The groups of lines in FIGS. 4A and 4B can correspond to different layers or overlapping layers of the device. For example, the first group of lines 410 in FIG. 4A can correspond to multiple device layers, e.g., a status bar and an application layer. Likewise, the first group of lines 460 in FIG. 4B can correspond to multiple device layers, e.g., a status bar and an application layer. The second group of lines 412 in FIG. 4A can correspond to a single device layer, e.g., an application layer. Likewise, the second group of lines 462 in FIG. 4B can correspond to a single device layer, e.g., an application layer. Further, the third group of lines 414 in FIG. 4A can correspond to multiple device layers, e.g., an application layer and an input method or keyboard. The third group of lines 464 in FIG. 4B can correspond to a single device layer, e.g., an application layer.

As shown in FIG. 4A, on left display 400, two display layers are overlapping at the top section 410 and the bottom section 414. Accordingly, the sections 410 and 414 utilize a bandwidth or instantaneous bandwidth with twice the speed of one layer or 2× bandwidth. In the middle section 412, there is a single display layer, which utilizes a bandwidth with the speed of one layer or 1× bandwidth. As shown in FIG. 4B, on right display 450, two display layers are overlapping at the top section 460. Therefore, section 460 can utilize a bandwidth with twice the speed of one layer or 2× bandwidth. In the middle section 462 and the bottom section 464, there is a single display layer. Thus, sections 462 and 464 utilize a bandwidth with a speed of one layer or 1× bandwidth.

As shown in FIGS. 4A and 4B, the combined instantaneous bandwidth for sections 410 and 460 is 4×, which is equal to 2×+2×. Accordingly, at the top sections 410 and 460, the data is fetched at a bandwidth of 4×. As such, the peak bandwidth is 4× in these sections or group of lines, e.g., 100 lines. The combined bandwidth for sections 412 and 462 is 2×, which is equal to 1×+1×. As such, at the middle sections 412 and 462, the data is fetched at a bandwidth of 2×. Moreover, the combined bandwidth for sections 414 and 464 is 3×, which is equal to 2×+1×. Thus, at the bottom sections 414 and 464, the data is fetched at a bandwidth of 3×.

For the refresh times for certain displays, e.g., 60 Hz displays, each frame may be refreshed in a certain amount of time, e.g., 16 ms. Also, each frame may have a certain number of display lines, e.g., 2560 lines. As such, each line may need to be refreshed within a certain time period, e.g., 2560 lines may need to be refreshed within 16 ms. Accordingly, in some aspects, there may be a certain number of seconds, e.g., 0.016/2560 seconds or 6.25 μs, to refresh each line in the display. This value corresponds to the line time, i.e., the amount of time allotted to refresh each line.

As mentioned above, each section in the display can correspond to a certain number of lines. Also, each display line may need to be refreshed within a certain time limit, i.e., the line time. In some aspects, if there is more data to fetch, and the display panel is running at a slow speed, then there may not be enough time to finish refreshing each line. Based on this, the bandwidth, i.e., speed at which data is fetched, may need to be increased, so all the data can be fetched within a certain time.

As shown in FIGS. 4A and 4B, in sections with overlapping display layers, the bandwidth or speed at which data is fetched may need to increase, e.g., run at 2× bandwidth. When the bandwidth for one display is combined with the other dual display, the combined bandwidth is the result. As shown in FIGS. 4A and 4B, a combined bandwidth of 4× may be needed to fetch the data for the top sections 410 and 460, a combined bandwidth of 2× may be needed to fetch the data for the middle sections 412 and 462, and a combined bandwidth of 3× may be needed to fetch the data for the bottom sections 414 and 464.

As indicated above, when dual displays are operating at the same time, the bandwidth used to fetch the data for both displays is combined. For instance, when the data is fetched for multiple displays, the data may be fetched at the same speed, so the bandwidths can be combined in corresponding sections. When data is fetched at a certain speed or bandwidth, the power consumed increases in proportion to the speed or bandwidth. Therefore, if the data is fetched at a bandwidth of 2×, then the amount of power consumed is doubled. Likewise, if the data is fetched at a bandwidth of 4×, then the amount of power consumed is quadrupled. Accordingly, the amount of power can increase rapidly if the bandwidth is high. Based on this, there is a motivation to reduce the speed or bandwidth at which data is fetched, such that the amount of power consumed will correspondingly decrease.

Aspects of the present disclosure can reduce the peak bandwidth for video mode panels and/or command mode panels. For instance, the present disclosure can reduce the peak bandwidth of display sections or groups of display lines in order to result in a corresponding reduction in power consumed. In order to do so, the present disclose can offset the refresh start time of one display compared to the other display in a dual panel display. For example, rather than refreshing the dual panels at the same time, the present disclosure can offset the refresh start time of one display. As mentioned above, this can result in a reduction in feedback and/or power consumed.

In some aspects, the present disclosure can include a phase shifted refresh for multi-panel display architecture. This shift can produce a refresh offset to align overlapping regions or layers, such that the bandwidth or instantaneous bandwidth (TB) can be minimized. In some instances, the display refresh may not start at the same time for both the displays when each display is showing independent content, i.e., a slight offset or difference in the refresh starting point for dual panel displays may not degrade the user viewing experience.

Figure 5A:
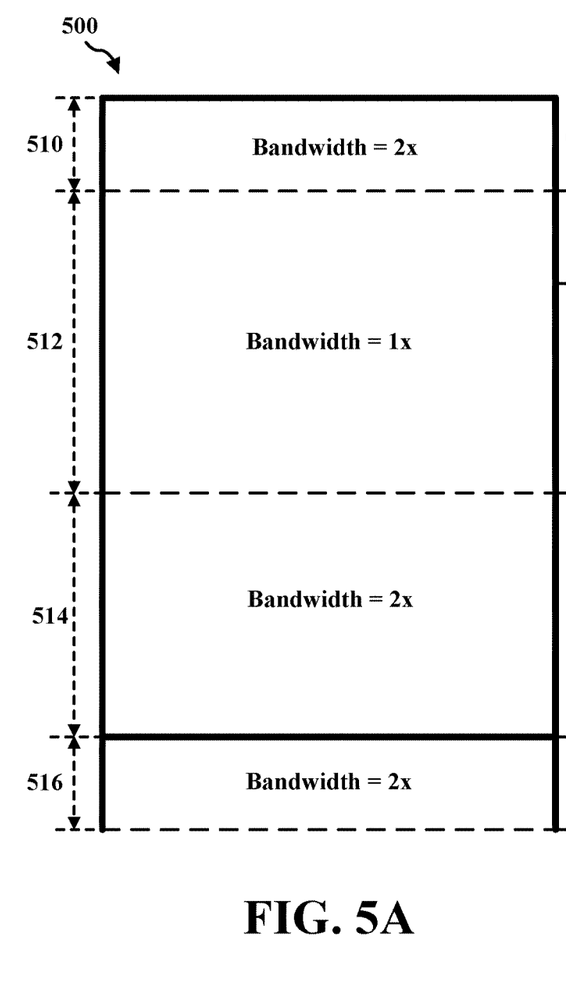
FIGS. 5A and 5B illustrate example displays in accordance with one or more techniques of this disclosure.
Figure 5B:
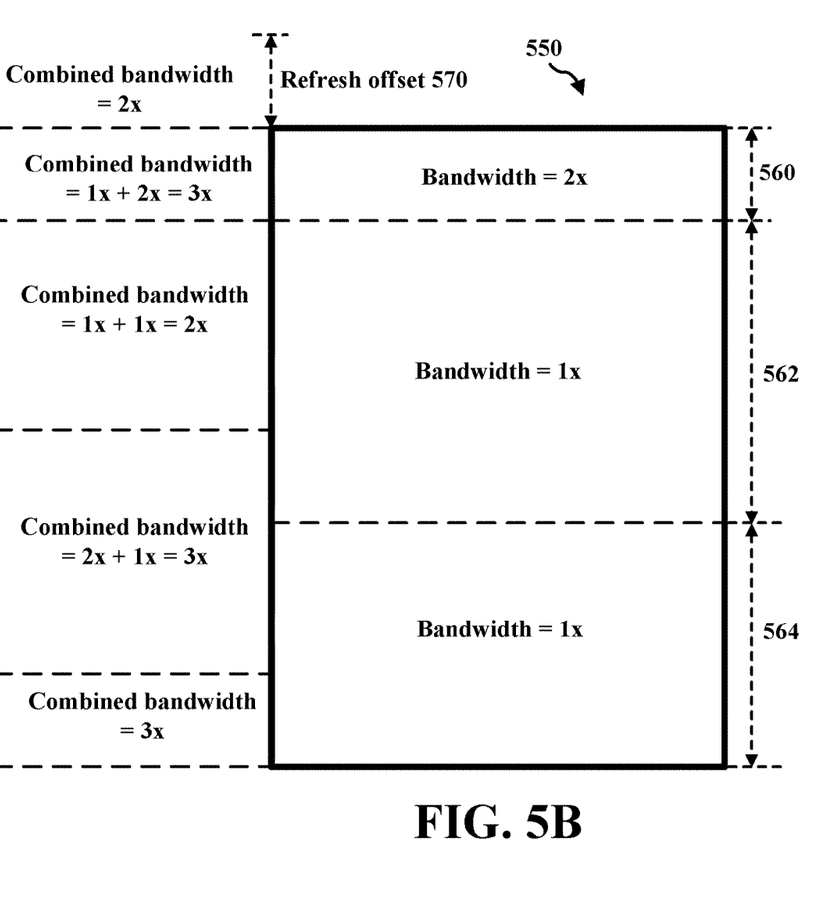

FIGS. 5A and 5B illustrate example displays 500 and 550, respectively, in accordance with one or more techniques of this disclosure. More specifically, FIGS. 5A and 5B show the bandwidth or instantaneous bandwidth in overlapping regions for an offset display refresh timeline in displays 500 and 550. For example, the left display 500 is one half of a dual display and the right display 550 is the other half of the dual display. As shown in FIG. 5A, display 500 includes first group of lines or pixels 510, second group of lines 512, third group of lines 514, and fourth group of lines 516. Groups of lines 510, 512, 514 can correspond to a first frame in display 500, and group of lines 516 can correspond to a second frame in display 500. As shown in FIG. 5B, display 550 includes first group of lines or pixels 560, second group of lines 562, and third group of lines 564. Groups of lines 560, 562, 564 can correspond to a first frame in display 550. Also, the refresh time of display 500 is offset from the refresh time of display 550 by a refresh offset 570.

As mentioned above, the groups of lines in FIGS. 5A and 5B can correspond to different or overlapping layers of the device. For example, the first group of lines 510 in FIG. 5A can correspond to multiple device layers, e.g., a status bar and an application layer. The first group of lines 560 in FIG. 5B can also correspond to multiple device layers, e.g., a status bar and an application layer. The second group of lines 512 in FIG. 5A can correspond to a single device layer, e.g., an application layer. Likewise, the second group of lines 562 in FIG. 5B can correspond to a single device layer, e.g., an application layer. Moreover, the third group of lines 514 in FIG. 5A can correspond to multiple device layers, e.g., an application layer and an input method or keyboard. The third group of lines 564 in FIG. 5B can correspond to a single device layer, e.g., an application layer.

As shown in FIGS. 5A and 5B, the refresh time of display 500 is offset from the refresh time of display 550, e.g., by a refresh offset 570. Contrast the offset refresh times of displays 500 and 550 with the aligned refresh times of displays 400 and 450 in FIGS. 4A and 4B. By offsetting the refresh times between displays 500 and 550, the combined bandwidth or instantaneous bandwidth and corresponding power can be reduced. For example, the maximum combined instantaneous bandwidth of offset displays 500 and 550 is 3×, while the maximum combined instantaneous bandwidth of aligned displays 400 and 450 is 4×. Accordingly, offset displays 500 and 550 will consume less power compared to aligned displays.

As shown in FIGS. 5A and 5B, the combined instantaneous bandwidth for section 510 is 2×, as this section is offset by refresh offset 570 and does not correspond to a section in display 550. The next combined instantaneous bandwidth section, e.g., sections 512 and 560, includes a combined instantaneous bandwidth of 3×, which is equal to 1×+2×. Accordingly, at this section, the data is fetched at a bandwidth of 3×. The next combined instantaneous bandwidth section, e.g., sections 512 and 562, includes a combined bandwidth of 2×, which is equal to 1×+1×. Further, the next combined instantaneous bandwidth section, e.g., sections 514 and 562/564, includes a combined bandwidth of 3×, which is equal to 2×+1×. The last combined instantaneous bandwidth section, e.g., sections 516 and 564, includes a combined bandwidth of 3×. As noted above, section 516 can correspond to a second frame in display 500. Accordingly, the refresh offset can apply to one or more frames in display 500 and/or one or more frames in display 550.

As mentioned herein, the combined bandwidth and corresponding power consumption can be reduced by offsetting the display refresh timeline for dual panel displays. As shown in FIGS. 5A and 5B, the refresh timeline of display 500 is shifted from the display 550 by refresh offset 570. This refresh offset can correspond to an amount of display lines, e.g., 100 lines. For example, if the first display 500 starts refreshing at time x, the second display 550 starts refreshing at time x+ the refresh offset amount.

As shown in FIGS. 5A and 5B, at the top of the first display 500, there is a 2× instantaneous bandwidth, but at this time the 2nd display is not refreshing. When the 2× instantaneous bandwidth ends, and the first display 500 starts the 1× instantaneous bandwidth, then the second display 550 starts refreshing at a 2× instantaneous bandwidth, such that the combined instantaneous bandwidth at this section is 3×. Accordingly, aspects of the present disclosure can reduce the peak bandwidth, e.g., from 4× to 3×, by offsetting the refresh start times of the dual panel displays.

In some aspects, the present disclosure can offset the refresh start times of the dual panels in both video mode and command mode. As such, the present disclosure can reduce the bandwidth, e.g., by offsetting the refresh start time for dual display panels, in both video mode and command mode.

For video mode panels, offsetting the refresh timing can be performed by the host or display processor. The display processor can determine the layer geometry, i.e., where each layer is positioned, and/or the peak bandwidth for a certain layer. For example, the display processor can determine if a certain layer, e.g., the status bar, is toward the top of the display. In some aspects, certain parts of layers can be positioned anywhere on the display, e.g., the application layer. The display processor or host processor can also determine the amount of overlap for each display section, e.g., when the status bar overlaps with the application layer. As such, the display processor can determine or prepare overlapping regions for both displays in the dual panel display.

Additionally, the display processor can determine the peak instantaneous bandwidth for each layer section or group of lines. The display processor can determine the amount of lines that should be offset, and/or how to most efficiently reduce the peak bandwidth by offsetting. For instance, the display processor can determine how the bandwidth can be reduced by offsetting, e.g., reducing the instantaneous bandwidth from 4× to 3× in the top section, as shown in FIGS. 5A and 5B. The display processor can then align the refresh timing based on the offset amount. As the refresh timing is applied by the display processor, the timing of the offset can also be synchronized at both displays. In some instances, the layer timing offset can remain the same until the layer geometry changes.

As indicated above, the display processor can determine an overlap for each of multiple layer sections or groups of display lines. The display processor can also calculate a minimum display refresh offset that can be applied to each of multiple layer sections or groups of display lines. In some aspects, this can be the optimum offset that can be applied in order to reduce the peak instantaneous bandwidth. The display processor can also apply the display offset to each of multiple display layers or groups of display lines. Further, the display processor can reduce the instantaneous bandwidth or IB selection after the offset is applied. Also, the current offset can remain valid until a new offset is applied.

In some aspects, on a layer geometry change, the present disclosure can calculate a bandwidth or IB for overlapping regions on each display. Aspects of the present disclosure can also calculate the minimal display refresh offset, such that the combined bandwidth or IB in each line time can be minimized. Moreover, aspects of the present disclosure can apply the offset in multiple phases by reducing the refresh rate on one display, such that visual impact may not be perceivable. In some instances, the display panels can be sourced from the same clock and/or drifts may not occur.

As discussed previously, command mode panels can operate on independent refresh timing, such the display processor may not control the refresh timeline. In some aspects, panel refresh timelines may be different depending upon the relative time panels were powered on, which can be subject to drift over time, i.e., the panel refresh timing may have some offset. As such, the command mode refresh timing can be based on when the panels start refreshing, e.g., when the panels are powered on or powered off.

In some instances, when a command is issued, the panel may respond by itself, e.g., without the help of the display processor. For example, if both panels are operating at a certain Hz or frame-per-second (fps) refresh rate, e.g., 60 Hz, then each panel may be aligned or offset by a certain amount, e.g., offset between 0-16 ms. As indicated above, in some aspects, there may already be an offset in the dual panels. Accordingly, if the present disclosure determines a small refresh offset, e.g., a 100 line offset, then the panels may already satisfy this offset. Thus, in some aspects, the panels may already have an offset and be misaligned, so the present disclosure can utilize this offset to reduce the amount of determined offset.

As indicated above, in some aspects of command mode panels, the refresh offset may already be at an optimal amount. In these aspects, the presents disclosure may determine the offset by computing the difference in frame retirement timelines of both the display panels. A frame retirement time is when one frame is cycled out and a new frame is started, i.e., a new frame is pushed to the display. As such, the time taken to start a new frame is the frame retirement time of the previous frame. For example, if frame N is currently displayed, and frame N+1 is pushed to the display, then the time taken to display the N+1 pixels on the display is the frame N retirement time. In some instances, when the frame retirement timeline is determined, then the present disclosure can determine when certain frames will retire. Further, based on the frame retirement timeline, the present disclosure can determine the refresh offset for the display panels. In some instances, if the offset amount is already optimal, then the present disclosure can proceed to reduce the bandwidth.

Additionally, aspects of the present disclosure can determine the combined bandwidth or IB by mapping the offset to the layer geometry. Based on this, the present disclosure can then select the bandwidth or IB. As such, the present disclosure can calculate and/or map the ideal bandwidth to the layer geometry.

By performing the aforementioned determinations, the present disclosure can calculate if the refresh offset if optimal. If the offset is optimal, then the present disclosure can reduce or adjust the bandwidth to attain the optimal bandwidth. In some aspects, when the data is fetched from the memory, the present disclosure may need to select the bandwidth. Based on the bandwidth selection, the memory or RAM processor can run faster or slower. As such, aspects of the present disclosure can select the bandwidth based on the layer geometry. If the layer geometry corresponds to a certain bandwidth, then that bandwidth may be selected. Further, if a certain refresh offset is optimal, then the present disclosure can reduce the bandwidth accordingly. If the offset is not optimal, then the present disclosure can apply steps similar to the video mode steps mentioned above.

As indicated above, the command mode panel offset may not be optimal and may need to be compensated. In some aspects, this offset can be applied to the display panels which are capable of supporting adaptive synchronization (Qsync) or a programmable shift for a delayed start time. As such, the refresh offset may be applied to panels with a programmable shift for a delayed start time. Accordingly, in some aspects, this can refer to panels that support an offset that can be applied by the display processor.

As mentioned herein, when the refresh offset is not optimal, the subsequent steps may be similar to video mode panels, except the command mode panels may support a programmable offset. For example, when the refresh offset is not optimal, the present disclosure can calculate the optimal display refresh offset such that the combined bandwidth or IB in each line time can be minimized, apply the offset in multiple phases by reducing the refresh rate on one display such that visual impact may not be perceived, and/or reduce the bandwidth or IB selection after the offset is applied. As also mentioned above, the refresh offset can remain valid until a new offset is applied. Thus, the present disclosure can determine the drift or offset and then apply a new offset.

Referring again to FIGS. 5A and 5B, the refresh offset can be implemented by a display processor, a display processing unit (DPU), a GPU, or a video processor. As shown in FIGS. 5A and 5B, aspects of the present disclosure can determine one or more overlapping layer regions based on the first display and the second display, e.g., the combined bandwidth=3× section between group of lines 512 and group of lines 560. In some aspects, the present disclosure can include more than two overlapping regions. For instance, there can be any number of overlapping regions and any number of layers or lines in each overlapping region. There can also be different numbers of overlapping regions on each display screen. Aspects of the present disclosure can also calculate an instantaneous bandwidth for each of the at least one group of lines in the first display, e.g., a bandwidth of 1× for group of lines 512, and each of the at least one group of lines in the second display, e.g., a bandwidth of 2× for group of lines 560, and/or calculate a combined instantaneous bandwidth for each of the one or more overlapping layer regions, e.g., a bandwidth of 3× for overlapping layer region including group of lines 560 and group of lines 512. For instance, aspects of the present disclosure can calculate a bandwidth for each overlapping region individually and then determine a display offset such that the combined bandwidth is minimized.

Aspects of the present disclosure can determine a refresh offset for at least one group of lines in a first display based on at least one group of lines in a second display, e.g., refresh offset 570. Aspects of the present disclosure can also apply the refresh offset for the at least one group of lines in the first display based on the at least one group of lines in the second display, e.g., refresh offset 570. Additionally, aspects of the present disclosure can adjust a combined instantaneous bandwidth corresponding to each of the at least one group of lines in the first display, e.g., group of lines 512, and each of the at least one group of lines in the second display, e.g., first group of lines 560, based on the applied refresh offset, e.g., refresh offset 570. In some aspects, the combined instantaneous bandwidth for each of the one or more overlapping layer regions can be calculated based on a sum of the instantaneous bandwidth for a corresponding group of lines in the first display and the instantaneous bandwidth for a corresponding group of lines in the second display.

Aspects of the present disclosure can also reduce the combined instantaneous bandwidth corresponding to each of the at least one group of lines in the first display, e.g., group of lines 512, and each of the at least one group of lines in the second display, e.g., group of lines 560. Moreover, aspects of the present disclosure can calculate a difference between a frame retirement duration for the first display, e.g., display 500, and a frame retirement duration for the second display, e.g., display 550. For example, the present disclosure can determine if a current offset is optimal, e.g., due to the different panels being powered on at different times. The present disclosure can then use this information to reduce the corresponding bandwidth.

Aspects of the present disclosure can also map the refresh offset to each of the at least one group of lines in the first display, e.g., first group of lines 510, and each of the at least one group of lines in the second display, e.g., first group of lines 560. In some aspects, the combined instantaneous bandwidth can be based on the mapped refresh offset. Additionally, the first display, e.g., display 500, and the second display, e.g., display 550 can support a programmable offset. In some aspects, the refresh offset, e.g., refresh offset 570, can be a minimum refresh offset to minimize the combined instantaneous bandwidth corresponding to each of the at least one group of lines in the first display, e.g., group of lines 512, and each of the at least one group of lines in the second display, e.g., group of lines 560.

In some aspects, the refresh offset, e.g., refresh offset 570, can be applied gradually over multiple stages. In some aspects, the at least one group of lines in the first display can correspond to at least one frame in the first display, where the at least one group of lines in the second display can correspond to at least one frame in the second display. In some instances, the instantaneous bandwidth for each of the at least one group of lines in the first display and each of the at least one group of lines in the second display is the speed at which data is fetched for each line in the at least one group of lines in the first display and each line in the at least one group of lines in the second display. Moreover, the first display, e.g., display 500, and the second display, e.g., display 550, can correspond to a dual panel display. Also, the refresh offset for the at least one group of lines in the first display, e.g., refresh offset 570, can be determined at a display processor.

As indicated above, the present disclosure can reduce the peak display bandwidth.

For instance, the layer geometry can include multiple overlapping layers in different applications. For example, the status bar and/or navigation bar can overlap with an application layer. Aspects of the present disclosure can reduce the peak bandwidth consumption for a majority of layer geometries or applications. Additionally, the present disclosure can result in a peak display bandwidth reduction, e.g., a 25% bandwidth reduction, for certain applications or platforms, e.g., in a gaming application or a prototype platform.

Figure 6:
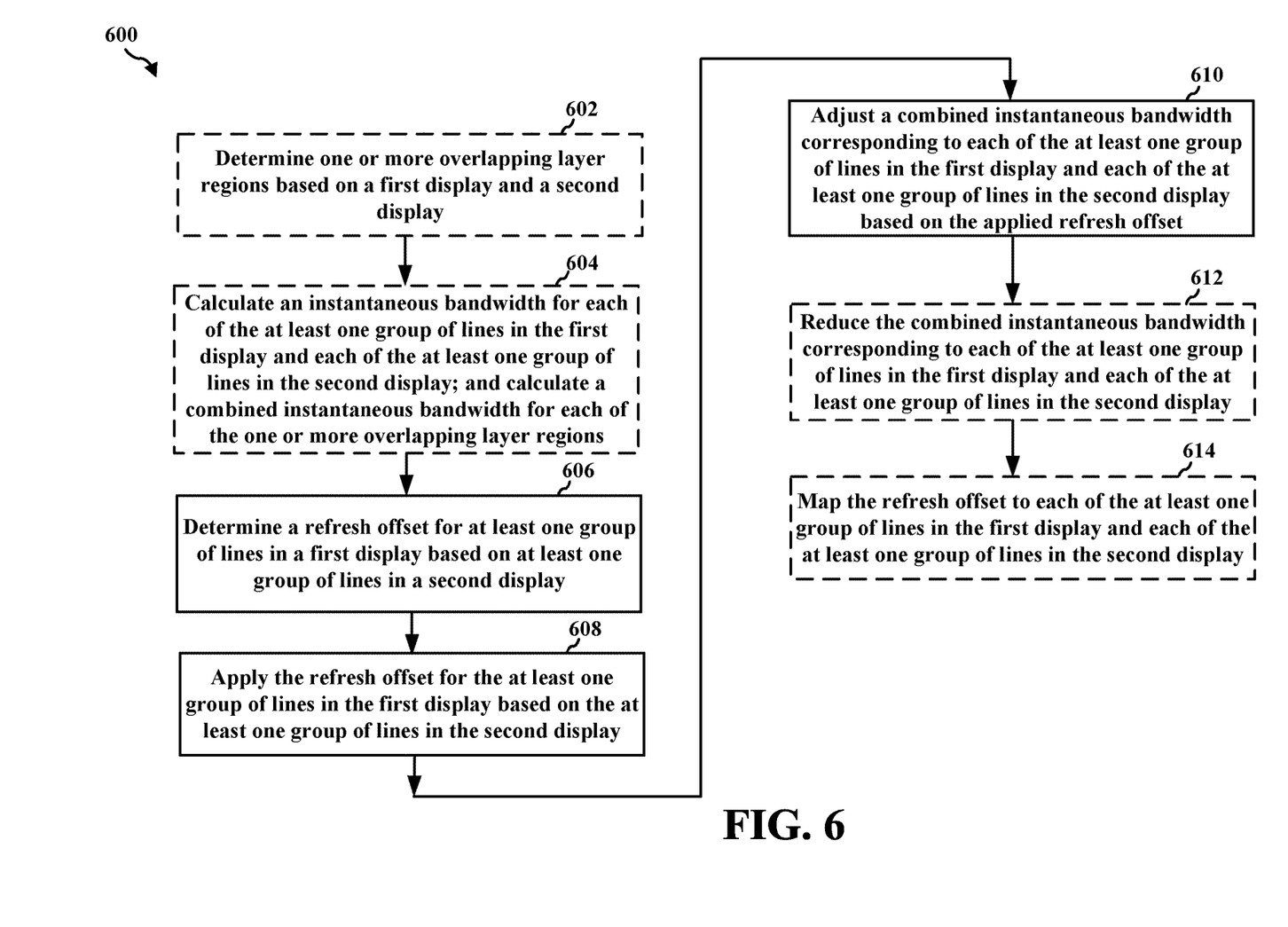
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by an apparatus such as a display processor, a display processing unit (DPU), a GPU, or a video processor. At 602, the apparatus may determine one or more overlapping layer regions based on the first display and the second display, as described in connection with the examples in FIGS. 3A, 3B, 4A, 4B, 5A, and 5B. At 604, the apparatus can calculate an instantaneous bandwidth for each of the at least one group of lines in the first display and each of the at least one group of lines in the second display and/or calculate a combined instantaneous bandwidth for each of the one or more overlapping layer regions, as described in connection with the examples in FIGS. 3A, 3B, 4A, 4B, 5A, and 5B.

At 606, the apparatus can determine a refresh offset for at least one group of lines in a first display based on at least one group of lines in a second display, as described in connection with the examples in FIGS. 3A, 3B, 4A, 4B, 5A, and 5B. At 608, the apparatus can also apply the refresh offset for the at least one group of lines in the first display based on the at least one group of lines in the second display, as described in connection with the examples in FIGS. 3A, 3B, 4A, 4B, 5A, and 5B. At 610, the apparatus can adjust a combined instantaneous bandwidth corresponding to each of the at least one group of lines in the first display and each of the at least one group of lines in the second display based on the applied refresh offset, as described in connection with the examples in FIGS. 3A, 3B, 4A, 4B, 5A, and 5B. At 612, the apparatus can also reduce the combined instantaneous bandwidth corresponding to each of the at least one group of lines in the first display and each of the at least one group of lines in the second display, as described in connection with the examples in FIGS. 3A, 3B, 4A, 4B, 5A, and 5B.

In some aspects, the combined instantaneous bandwidth for each of the one or more overlapping layer regions can be calculated based on a sum of the instantaneous bandwidth for a corresponding group of lines in the first display and the instantaneous bandwidth for a corresponding group of lines in the second display. Additionally, the apparatus can calculate a difference between a frame retirement duration for the first display and a frame retirement duration for the second display, as described in connection with the examples in FIGS. 3A, 3B, 4A, 4B, 5A, and 5B.

At 614, the apparatus can also map the refresh offset to each of the at least one group of lines in the first display and each of the at least one group of lines in the second display, as described in connection with the examples in FIGS. 3A, 3B, 4A, 4B, 5A, and 5B. In some aspects, the combined instantaneous bandwidth can be based on the mapped refresh offset, as described in connection with the examples in FIGS. 3A, 3B, 4A, 4B, 5A, and 5B. Additionally, the first display and the second display can support a programmable offset, as described in connection with the examples in FIGS. 3A, 3B, 4A, 4B, 5A, and 5B. In some aspects, the refresh offset for the at least one group of lines in the first display can be a minimum refresh offset to minimize the combined instantaneous bandwidth corresponding to each of the at least one group of lines in the first display and each of the at least one group of lines in the second display, as described in connection with the examples in FIGS. 3A, 3B, 4A, 4B, 5A, and 5B.

In some aspects, the refresh offset for the at least one group of lines in the first display is applied gradually over multiple stages, as described in connection with the examples in FIGS. 3A, 3B, 4A, 4B, 5A, and 5B. Also, the at least one group of lines in the first display can correspond to at least one frame in the first display, where the at least one group of lines in the second display can correspond to at least one frame in the second display, as described in connection with the examples in FIGS. 3A, 3B, 4A, 4B, 5A, and 5B. In some instances, the instantaneous bandwidth for each of the at least one group of lines in the first display and each of the at least one group of lines in the second display can be the speed at which data is fetched for each line in the at least one group of lines in the first display and each line in the at least one group of lines in the second display, as described in connection with the examples in FIGS. 3A, 3B, 4A, 4B, 5A, and 5B.

Moreover, the first display and the second display can correspond to a dual panel display, as described in connection with the examples in FIGS. 3A, 3B, 4A, 4B, 5A, and 5B. Also, the refresh offset for the at least one group of lines in the first display can be determined at a display processor, as described in connection with the examples in FIGS. 3A, 3B, 4A, 4B, 5A, and 5B.

As mentioned above, the aforementioned methods and flowcharts can apply to video mode panels and/or command mode panels. In some aspects, command mode panels may not support a programmable offset. For instance, there may not be an option to adjust offsets. In some instances, displays may be turned on independently and/or at different times, so there may be some offset as panels may not start refreshing at the same time. Aspects of the present disclosure can determine the offset difference between panels, e.g., using a frame retirement duration or a retirement fence timeline, and/or reduce the corresponding bandwidth if the existing offset reduces the combined bandwidth.

Additionally, in some aspects, command mode panels may support a programmable offset. In these aspects, the command mode panels may be similar to video mode panels, except that the panels may need to be programmed to change the determined offset, e.g., determined by the host. In some instances, due to the independent nature of both panels, as well as an independent display controller inside the panels, drift may occur. Also, frame retirement durations or retirement fence timelines may be analyzed to determine if the panels include drift and/or whether any drifted offset may result in an increase in the combined bandwidth. In these instances, one of the panels may be programmed to adjust the offset.

In one configuration, a method or apparatus for display processing is provided. The apparatus may be a display processor, a display processing unit (DPU), a GPU, or a video processor or some other processor that can perform display processing. In one aspect, the apparatus may be the processing unit 120 within the device 104, or may be some other hardware within device 104 or another device. The apparatus may include means for determining a refresh offset for at least one group of lines in a first display based on at least one group of lines in a second display. The apparatus may also include means for applying the refresh offset for the at least one group of lines in the first display based on the at least one group of lines in the second display. The apparatus may also include means for adjusting a combined instantaneous bandwidth corresponding to each of the at least one group of lines in the first display and each of the at least one group of lines in the second display based on the applied refresh offset. The apparatus may also include means for determining one or more overlapping layer regions based on the first display and the second display. The apparatus may also include means for calculating a bandwidth for the at least one first overlapping layer region. The apparatus may also include means for calculating an instantaneous bandwidth for each of the at least one group of lines in the first display and each of the at least one group of lines in the second display and/or means for calculating a combined instantaneous bandwidth for each of the one or more overlapping layer regions. The apparatus may also include means for reducing the combined instantaneous bandwidth corresponding to each of the at least one group of lines in the first display and each of the at least one group of lines in the second display. The apparatus may also include means for calculating a difference between a frame retirement duration for the first display and a frame retirement duration for the second display. The apparatus may also include means for mapping the refresh offset to each of the at least one group of lines in the first display and each of the at least one group of lines in the second display, where the combined instantaneous bandwidth is based on the mapped refresh offset.

The subject matter described herein can be implemented to realize one or more benefits or advantages. For instance, the described display and/or graphics processing techniques can be used by a display processor, a display processing unit (DPU), a GPU, or a video processor or some other processor that can perform display processing to implement the refresh offset techniques described herein. This can also be accomplished at a low cost compared to other display or graphics processing techniques. Moreover, the display or graphics processing techniques herein can improve or speed up data processing or execution. Further, the display or graphics processing techniques herein can improve resource or data utilization and/or resource efficiency. Additionally, aspects of the present disclosure can utilize a display refresh offset that can reduce power consumption.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of display processing, comprising:
calculating an instantaneous bandwidth for each of a plurality of groups of lines in a first display and each of a plurality of groups of lines in a second display, wherein the plurality of groups of lines in the first display and the plurality of groups of lines in the second display include one or more overlapping layer regions, and wherein the instantaneous bandwidth is calculated by combining a corresponding bandwidth of the one or more overlapping layer regions;
calculating a combined instantaneous bandwidth for a group of lines in the first display and a corresponding group of lines in the second display;
determining a refresh offset for the plurality of groups of lines in the first display based on the plurality of groups of lines in the second display;
applying the refresh offset for the plurality of groups of lines in the first display based on the plurality of groups of lines in the second display; and
adjusting the combined instantaneous bandwidth based on the applied refresh offset such that the adjusted combined instantaneous bandwidth is less than the combined instantaneous bandwidth.

2. The method of claim 1, further comprising:
determining the one or more overlapping layer regions based on the first display and the second display, wherein each of the one or more overlapping regions correspond to a group of lines in the first display and a group of lines in the second display.

3. The method of claim 1, wherein the combined instantaneous bandwidth for each of the one or more overlapping layer regions is calculated based on a sum of the instantaneous bandwidth for a corresponding group of lines in the first display and the instantaneous bandwidth for a corresponding group of lines in the second display.

4. The method of claim 1, wherein adjusting the combined instantaneous bandwidth corresponding to each of the plurality of groups of lines in the first display and each of the plurality of groups of lines in the second display further comprises:
reducing the combined instantaneous bandwidth corresponding to each of the plurality of groups of lines in the first display and each of the plurality of groups of lines in the second display.

5. The method of claim 1, wherein determining the refresh offset for the plurality of groups of lines in the first display based on the plurality of groups of lines in the second display further comprises:
calculating a difference between a frame retirement duration for the first display and a frame retirement duration for the second display.

6. The method of claim 1, further comprising:
mapping the refresh offset to each of the plurality of groups of lines in the first display and each of the plurality of groups of lines in the second display, wherein the combined instantaneous bandwidth is based on the mapped refresh offset.

7. The method of claim 1, wherein the first display and the second display support a programmable offset.

8. The method of claim 1, wherein the refresh offset for the plurality of groups of lines in the first display is a minimum refresh offset to minimize the combined instantaneous bandwidth corresponding to each of the plurality of groups of lines in the first display and each of the plurality of groups of lines in the second display.

9. The method of claim 1, wherein the refresh offset for the plurality of groups of lines in the first display is applied gradually over multiple stages.

10. The method of claim 1, wherein the plurality of groups of lines in the first display correspond to at least one frame in the first display, wherein the plurality of groups of lines in the second display correspond to at least one frame in the second display.

11. The method of claim 1, wherein the instantaneous bandwidth for each of the plurality of groups of lines in the first display and each of the plurality of groups of lines in the second display is a speed at which data is fetched for each line in the plurality of groups of lines in the first display and each line in the plurality of groups of lines in the second display.

12. The method of claim 1, wherein the first display and the second display correspond to a dual panel display.

13. The method of claim 1, wherein the refresh offset for the plurality of groups of lines in the first display is determined at a display processor.

14. An apparatus for display processing, comprising:
a memory; and
at least one processor coupled to the memory and configured to:
calculate an instantaneous bandwidth for each of a plurality of groups of lines in a first display and each of a plurality of groups of lines in a second display, wherein the plurality of groups of lines in the first display and the plurality of groups of lines in the second display include one or more overlapping layer regions, and wherein the instantaneous bandwidth is calculated by combining a corresponding bandwidth of the one or more overlapping layer regions;
calculate a combined instantaneous bandwidth for a group of lines in the first display and a corresponding group of lines in the second display;
determine a refresh offset for the plurality of groups of lines in the first display based on the plurality of groups of lines in the second display;
apply the refresh offset for the plurality of groups of lines in the first display based on the plurality of groups of lines in the second display; and
adjust the combined instantaneous bandwidth based on the applied refresh offset such that the adjusted combined instantaneous bandwidth is less than the combined instantaneous bandwidth.

15. The apparatus of claim 14, wherein the at least one processor is further configured to:
determine the one or more overlapping layer regions based on the first display and the second display, wherein each of the one or more overlapping regions correspond to a group of lines in the first display and a group of lines in the second display.

16. The apparatus of claim 14, wherein the combined instantaneous bandwidth for each of the one or more overlapping layer regions is calculated based on a sum of the instantaneous bandwidth for a corresponding group of lines in the first display and the instantaneous bandwidth for a corresponding group of lines in the second display.

17. The apparatus of claim 14, wherein adjusting the combined instantaneous bandwidth corresponding to each of the plurality of groups of lines in the first display and each of the plurality of groups of lines in the second display further comprises the at least one processor configured to:
reduce the combined instantaneous bandwidth corresponding to each of the plurality of groups of lines in the first display and each of the plurality of groups of lines in the second display.

18. The apparatus of claim 14, wherein to determine the refresh offset for the plurality of groups of lines in the first display based on the plurality of groups of lines in the second display further comprises the at least one processor configured to:
calculate a difference between a frame retirement duration for the first display and a frame retirement duration for the second display.

19. The apparatus of claim 14, wherein the at least one processor is further configured to:
map the refresh offset to each of the plurality of groups of lines in the first display and each of the plurality of groups of lines in the second display, wherein the combined instantaneous bandwidth is based on the mapped refresh offset.

20. The apparatus of claim 14, wherein the first display and the second display support a programmable offset.

21. The apparatus of claim 14, wherein the refresh offset for the plurality of groups of lines in the first display is a minimum refresh offset to minimize the combined instantaneous bandwidth corresponding to each of the plurality of groups of lines in the first display and each of the plurality of groups of lines in the second display.

22. The apparatus of claim 14, wherein the refresh offset for the plurality of groups of lines in the first display is applied gradually over multiple stages.

23. The apparatus of claim 14, wherein the plurality of groups of lines in the first display correspond to at least one frame in the first display, wherein the plurality of groups of lines in the second display correspond to at least one frame in the second display.

24. The apparatus of claim 14, wherein the instantaneous bandwidth for each of the plurality of groups of lines in the first display and each of the plurality of groups of lines in the second display is a speed at which data is fetched for each line in the plurality of groups of lines in the first display and each line in the plurality of groups of lines in the second display.

25. The apparatus of claim 14, wherein the first display and the second display correspond to a dual panel display.

26. The apparatus of claim 14, wherein the refresh offset for the plurality of groups of lines in the first display is determined at a display processor.

27. An apparatus for display processing, comprising:
means for calculating an instantaneous bandwidth for each of a plurality of groups of lines in a first display and each of a plurality of groups of lines in a second display, wherein the plurality of groups of lines in the first display and the plurality of groups of lines in the second display include one or more overlapping layer regions, and wherein the instantaneous bandwidth is calculated by combining a corresponding bandwidth of the one or more overlapping layer regions;
means for calculating a combined instantaneous bandwidth for a group of lines in the first display and a corresponding group of lines in the second display;
means for determining a refresh offset for the plurality of groups of lines in the first display based on the plurality of groups of lines in the second display;
means for applying the refresh offset for the plurality of groups of lines in the first display based on the plurality of groups of lines in the second display; and
means for adjusting the combined instantaneous bandwidth based on the applied refresh offset such that the adjusted combined instantaneous bandwidth is less than the combined instantaneous bandwidth.

28. A non-transitory computer-readable medium storing computer executable code for display processing, the code when executed by a processor causes the processor to:
calculate an instantaneous bandwidth for each of a plurality of groups of lines in a first display and each of a plurality of groups of lines in a second display, wherein the plurality of groups of lines in the first display and the plurality of groups of lines in the second display include one or more overlapping layer regions, and wherein the instantaneous bandwidth is calculated by combining a corresponding bandwidth of the one or more overlapping layer regions;
calculate a combined instantaneous bandwidth for a group of lines in the first display and a corresponding group of lines in the second display;
determine a refresh offset for the plurality of groups of lines in the first display based on the plurality of groups of lines in the second display;
apply the refresh offset for the plurality of groups of lines in the first display based on the plurality of groups of lines in the second display; and
adjust the combined instantaneous bandwidth based on the applied refresh offset such that the adjusted combined instantaneous bandwidth is less than the combined instantaneous bandwidth.

* * * * *